United States Patent [19]

Willis

[11] Patent Number: 4,687,546
[45] Date of Patent: Aug. 18, 1987

[54] METHOD OF CONCENTRATING SLURRIED KAOLIN

[75] Inventor: Mark S. Willis, Milledgeville, Ga.

[73] Assignee: Georgia Kaolin Company, Inc., Union, N.J.

[21] Appl. No.: 757,049

[22] Filed: Jul. 19, 1985

[51] Int. Cl.$^4$ .......................... B01D 1/28; B01D 3/06
[52] U.S. Cl. .................... 159/2.1; 159/17.1; 159/24.3; 159/47.1; 159/DIG. 32; 203/14; 203/26; 203/27; 203/88; 203/DIG. 8; 202/174; 202/176; 202/235; 501/150; 210/774
[58] Field of Search ...................... 159/47.1, 2.1, 17.1, 159/DIG. 8, DIG. 32, 24.3; 203/14, 26, 27, 88, DIG. 8; 202/235, 174, 176; 501/150, 144; 162/189, 181.8; 210/774

[56] References Cited

U.S. PATENT DOCUMENTS

| | | | |
|---|---|---|---|
| 2,032,182 | 2/1936 | Öman | 159/49 |
| 2,406,581 | 8/1946 | Bergström et al. | 159/47.1 |
| 2,487,884 | 11/1949 | Lunt | 203/24 |
| 2,647,570 | 8/1953 | Lockman | 159/47.3 |
| 2,777,514 | 1/1957 | Eckstrom | 159/47.1 |
| 2,895,546 | 7/1959 | Sadtler | 159/24 R |
| 3,165,435 | 1/1965 | Henszey | 203/26 |
| 3,176,755 | 4/1965 | Harman | 159/47.3 |
| 3,289,736 | 12/1966 | Rosenblad | 159/47.3 |
| 3,396,086 | 8/1968 | Starmer | 202/183 |
| 3,428,107 | 2/1969 | Backteman | 159/47.3 |
| 3,514,375 | 5/1970 | Dambrine | 159/DIG. 22 |
| 4,002,525 | 1/1977 | Baierl | 159/49 |
| 4,185,395 | 1/1980 | Nakako et al. | 159/47.1 |
| 4,246,039 | 1/1981 | Nixon, Jr. | 501/150 |
| 4,303,468 | 12/1981 | Laguilharre et al. | 203/26 |

FOREIGN PATENT DOCUMENTS

| | | | |
|---|---|---|---|
| 0032171 | 3/1979 | Japan | 159/24.1 |
| 1065619 | 4/1967 | United Kingdom | 202/235 |
| 2046108 | 11/1980 | United Kingdom | 202/235 |

Primary Examiner—S. Leon Bashore
Assistant Examiner—V. Manoharan
Attorney, Agent, or Firm—William W. Habelt

[57] ABSTRACT

A beneficiated kaolin clay slurry is concentrated from a solids content of about 50% to 60% by weight to a solids content of at least 65% by weight by evaporating water therefrom by passing the aqueous clay slurry through one or more non-contact evaporated heat exchangers. The kaolin clay slurry is passed in indirect heat exchange relationship with a heating vapor, with the heating vapor comprising water vapor previously evaporated from the aqueous clay slurry.

11 Claims, 3 Drawing Figures slurry in the upstream-most evaporative heat exchanger prior to passing the aqueous clay slurry to the upstream-most evaporative heat exchanger.

DESCRIPTION OF THE PREFERRED EMBODIMENT

In order to be useful in paper filling, paper coating and paint making, naturally occurring crude kaolin clays must generally be processed to upgrade the clay in brightness and to reduce abrasiveness of the clay. In conventional commercial processing for producing beneficiated kaolin clay, the clay is first blunged in water with a dispersing agent to form a clayin-water suspension or slurry. After degritting and fractionation on a centrifuge to recover a desired particle size fraction, the fine particle fraction is typically diluted with water to 15% to 40% by weight solids content. This suspension is then typically treated with a bleaching compound containing a reducing agent, such as the dithionite ion, to reduce ferric ions in the clay to the ferrous state. After allowing the clay fraction to react with a reducing agent for a period of time, the clay fraction is filtered, rinsed and then dried for shipment. Generally, for commercial purposes, the clay slurry must be shipped at a solids content of at least 65% by weight, and for most applications at about 70% solids by weight.

Figure 1:
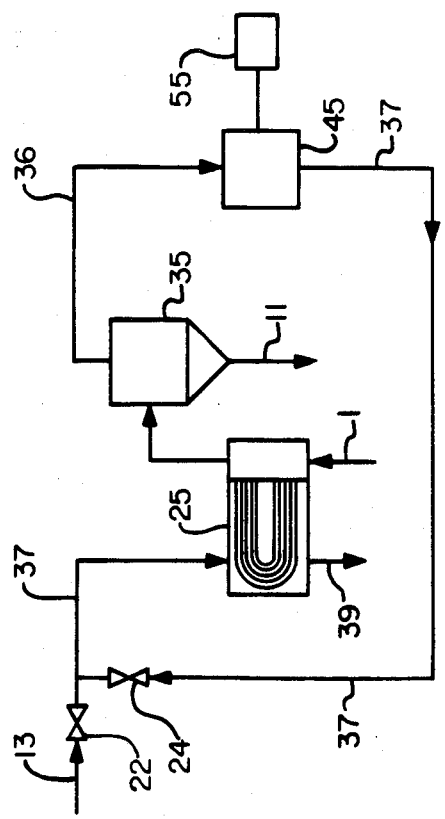
FIG. 1 is a schematic view of an embodiment of the process of the present invention using a single non-contact evaporative heat exchanger.

In the single evaporative heat exchanger embodiment of the present invention shown in FIG. 1, a partially dried beneficiated clay slurry 1, typically having a solids content in the range of about 50% to about 60% by weight, to be further dewatered to concentrate the solids therein to a level suitable for shipment, typically at least 65% solids by weight, is passed through a single non-contact type evaporative heat exchanger 25 in indirect contact with a heating vapor wherein a portion of the water contained in the aqueous clay slurry is evaporated. The clay slurry leaving the evaporative heat exchanger 25 passes to a separating vessel 35 wherein the vapor evaporated from the clay slurry in the evaporative heat exchanger 25 is separated from the clay slurry. The clay slurry 11 leaving the separating vessel 35 has been dried to the desired solids level and is ready for shipment.

The water vapor 36 evaporated from the aqueous clay slurry 1 in the evaporative heat exchanger 25 is passed from the separating vessel 35 to a compressor 45 powered by drive means 55 such as an electric motor or drive turbine. The compressor 45 serves not only to compress the vapor 36 but also to increase its temperature. The compressed vapor 37 leaving the compressor 45 is passed back to the evaporative heat exchanger 25 wherein the compressed vapor 37 passes in indirect heat exchange relationship with the incoming aqueous clay slurry 1 to evaporate water therefrom in order to concentrate the slurry to the desired solids content. In this manner, a continuous process is established wherein water vapor evaporated from the clay slurry is collected, compressed and recycled to the evaporative heat exchanger as the heating vapor evaporating water from the clay slurry. Further, the condensed water from the heating vapor passed through the heat exchanger 25 may be collected and used for the other purposes within the plant in order to utilize any heat content contained therein.

Naturally, steam from an auxiliary source is needed as the heating vapor during start-up of the process. Start-up steam 13 from an auxiliary source is supplied to the evaporative heat exchanger 25 by opening valve 22. Once sufficient water vapor has been evaporated from the aqueous clay slurry passing through heat exchanger 25 in indirect heat exchange relationship with the start-up steam, valve 22 is closed to terminate steam flow and valve 24 opened to pass recycled compressed vapor 37 through the heat exchanger 25 as the heating vapor. Steady-state operation may then be maintained using the recycled compressed vapor 37 as the heating vapor.

For purposes of illustration, the FIG. 1 embodiment of the process of the present invention would typically be carried out in the following manner. A continuous stream of aqueous clay slurry having a solids content of 60% is passed through the evaporative heat exchanger 25. The separating vessel 35 is operated at a pressure of 2.223 p.s.i. absolute resulting in boiling of the aqueous clay slurry at 130° F. The water vapor 36 collected in the separating vessel 35 is passed through the mechanical compressor 45 and compressed to a pressure of about 3.553 p.s.i. absolute resulting in a temperature rise to about 148° F. The compressed vapor 37 is then passed through the heat exchanger 25 as the heating vapor in indirect heat exchange with the aqueous clay slurry. It is estimated that about 373 kilowatts of energy would be expended in concentrating an aqueous clay slurry under these conditions at a rate of one hundred tons per hour of dry clay from a solids content of 60% to 70%.

Figure 2:
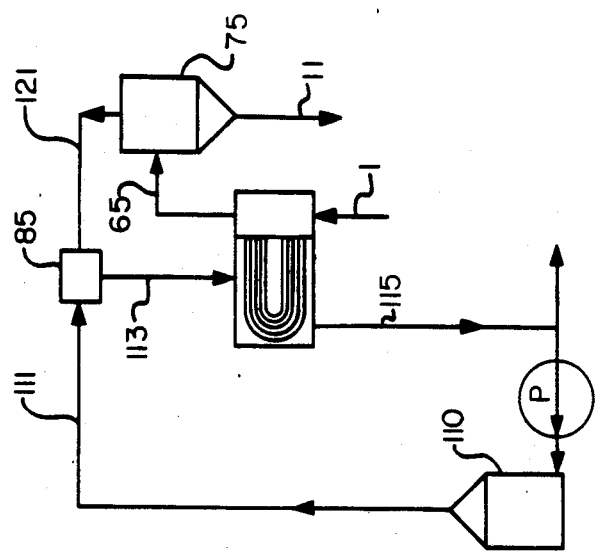
FIG. 2 is a schematic view of an alternate embodiment of the process of the present invention using a single noncontact evaporative heat exchanger.

In an alternate embodiment of the present invention shown in FIG. 2, water vapor evaporated previously from the aqueous clay slurry is again cycled back to the evaporative heat exchanger but is thermally compressed rather then mechanically compressed as in the FIG. 1 embodimnent. As seen in FIG. 2, a partially dried beneficiated clay slurry 1, typically having a solids content in the range of about 50% to about 60% by weight to be further dewatered to concentrate the solids therein to a level suitable for shipment, typically at least 65% solids by weight, is passed through a single non-contact evaporative heat exchanger 65 in indirect contact with a heating vapor 113. The clay slurry leaving the evaporative heat exchanger 65 passes to a separating vessel 75 wherein the vapor evaporated from the clay slurry in the evaporative heat exchanger 65 is separated from the clay slurry. The clay slurry 11 leaving the separating vessel 75 has been dried to the desired solids level and is ready for shipment.

The water vapor 121 evaporated from the aqueous clay 1 in the evaporative heat exchanger 65 is passed from the separting vessel 75 to a mixing means 85 wherein low pressure saturated steam 111 supplied from a auxiliary source, such as boiler 110, is injected into the water vapor 121 to thermally compress the vapor. The resulting vapor mixture 113 would have a higher pressure and higher temperature than the water vapor 121 and would have a sufficiently high temperature so as to be suitable as the heating vapor 113 to be passed in heat

METHOD OF CONCENTRATING SLURRIED KAOLIN

BACKGROUND OF THE INVENTION

The present invention relates generally to the processing of clay and, more particularly, to a method for concentrating a beneficiated aqueous kaolin clay slurry by evaporating water therefrom using indirect heat exchange.

Kaolin clay has many known applications in industry, including use as a filler in papermaking, a coating for paper, and a pigment in paint. However, crude kaolin clay typically contains various impurities which cause discoloration. Additionally, crude kaolin is typically too abrasive for direct use in these products. Therefore, it is necessary to beneficiate the crude kaolin clay by various well-known commercial processes which increase the brightness of the kaolin by removing discoloration impurities and decrease the abrasiveness by reducing the particle size of the kaolin particles.

In general, such processes for beneficiating crude kaolin clay require that the clay be processed as a low solids slurry. Therefore, it is necessary to add substantial amounts of water to the dry crude kaolin clay to form a clay suspension or slurry having a low solids content, typically in the range of 15% to 40% by weight. However, for commercial applications, the beneficiated clay slurry must have a much higher solids content. Typically benficiated kaolin clays are shipped commercially for use in paper making, paper coating and paint making as a high solids slurry having a solids content in the range of 65% to 75% by weight. Therefore, most of the water added to the dry kaolin clay must be removed in order to concentrate the clay solids.

To dewater a beneficiated clay slurry, the low-solids slurry is typically first passed to a vacuum or press type filter wherein a limited portion of the water is removed from the slurry. Typically, the filter cake from the filter would have a solids content of about 50% to 60% by weight. Thus, the slurry would still comprise about 40% to 50% water. Further dewatering on a vacuum or press type filter is impractical due to the fine particle size of the solids in the beneficiated clay slurry. Typically, to further dewater the beneficiated clay slurry to a commercially acceptable solids content, at least a portion of the partially dewatered slurry is passed through a spray dryer or other direct contact-type evaporator such as a gas-fired kiln, wherein the clay slurry is contacted with a drying medium having a temperature of 1000° F. or more, such as hot air or hot flue gas typically generated from the combustion of natural gas. Although all of the clay slurry may be passed through the spray dryer for drying, it is customary to pass only a portion of the clay slurry through the spray dryer and then to re-mix the thoroughly dried clay slurry from the spray dryer with the remaining portion of partially dewatered slurry in a high shear mixer to produce a product clay slurry having a solids content of 65% to 75%.

A problem encountered in concentrating clay slurries in spray dryers or other direct contact-type evaporators is the formation of agglomerates of dried clay during direct contact evaporation. Therefore, it is often necessary to pass the product clay slurry through a pulverizer in order to breakup such agglomerates prior to shipping the slurry. Additionally, when kaolin clays are dried in direct contact-type evaporators such as spray dryers at these high temperatures, the brightness of the clay particles deteriorate slightly. Further, spray drying is a relatively inefficient process and considerable energy is consumed in the spray drying process in order to evaporate the water in the clay slurry.

It is the general object of the present invention to provide a method for concentrating a beneficiated aqueous clay slurry in an energy efficient manner wherein the energy expended in evaporating water from the clay slurry is reduced.

It is a further object of the present invention to provide a method for concentrating the beneficiated aqueous clay kaolin slurry by evaporation without the formation of agglomerates or the deterioration of clay brightness during the drying process.

SUMMARY OF THE INVENTION

In accordance with the present invention, an aqueous beneficiatd clay slurry is concentrated from a solids content of about 50% to 60% by weight to a solids content of at least 65% by weight by evaporating water therefrom by passing the aqueous clay slurry through one or more non-contact evaporative heat exchangers in indirect heat exchange relationship with a heating vapor wherein the heating vapor comprises water vapor previously evaporated from the aqueous clay slurry. In this manner, an energy efficient process is provided for concentrating a beneficiated aqueous clay slurry in that the present invention makes use of the heat normally wasted when the flue gas from the spray dryer together with the water vapor evaporated from the clay during the spray drying process is vented to the atmosphere. Further, by using indirect heat exchange between the aqueous clay slurry and the heating vapor as a means of evaporating water vapor from the clay slurry, the formation of agglomerates typically encountered in the direct contact evaporators is avoided.

In one embodiment of the present invention, a continuous stream of clay slurry to be concentrated is passed through a single non-contact type evaporative heat exchanger in indirect heat exchange relationship with recycled water vapor. That is, water vapor evaporated from the clay slurry in the heat exchanger is collected, compressed to increase its temperature, and recycled to the heat exchanger as the heating vapor to evaporate water from the incoming clay slurry.

In another embodiment of the present invention, a continuous stream of the clay slurry to be concentrated is passed through a plurality of non-contact evaporative heat exchangers in series flow from the upstream-most of the heat exchangers to the downstream-most of the heat exchangers in indirect heat exchange relationship with a heating vapor. The heating vapor in each of the evaporative heat exchangers comprises the water vapor evaporated from the aqueous clay slurry in the adjacent downstream evaporative heat exchanger except in the downstream-most of the evaporative heat exchangers wherein the heating vapor is supplied from an independent source. Preferably, the aqueous clay slurry exiting the downstream-most evaporative heat exchanger is passed through a flash tank wherein additional water is removed from the aqueous clay slurry thereby further concentrating the solids in the aqueous clay slurry. Additionally, it is preferred that the aqueous clay slurry to be concentrated be preheated by passing the aqueous clay slurry in indirect heat exchange relationship with the water vapor evaporated from the aqueous clay exchange relationship with the aqueous clay slurry 1 in the evaporative heat exchanger 65. The heating vapor 113 passing through the evaporative heat exchanger would be condensed and the condensate 115 pumped in part back to the boiler 110 and in part used for other purposes within the plant so as not to waste its heat content.

In operation, start-up of the process is accomplished by passing steam 111 from the auxiliary source through the evaporative heat exchanger 65. As water vapor is evaporated from the aqueous clay slurry, it is collected in the separating vessel 75 and the collected water vapor 121 passed to mixing means 85 to mix with incoming steam. The resulting compressed vapor 113 is then passed through the heat exchanger 65 as the heating vapor 113. It is presently contemplated that steady state operation of the process would be carried out with a compressed vapor mixture comprising 50% recycled water vapor 121 and 50% saturated steam 111 at a pressure of about 150 p.s.i. or more. Steady-state operation is maintained by cycling only that portion of the condensate 115 necessary to maintain the desired steam flow-back to the boiler 110 while using the reminder of the condensate in other parts of the plant. In this manner, steam requirements are substantially reduced.

Figure 3:
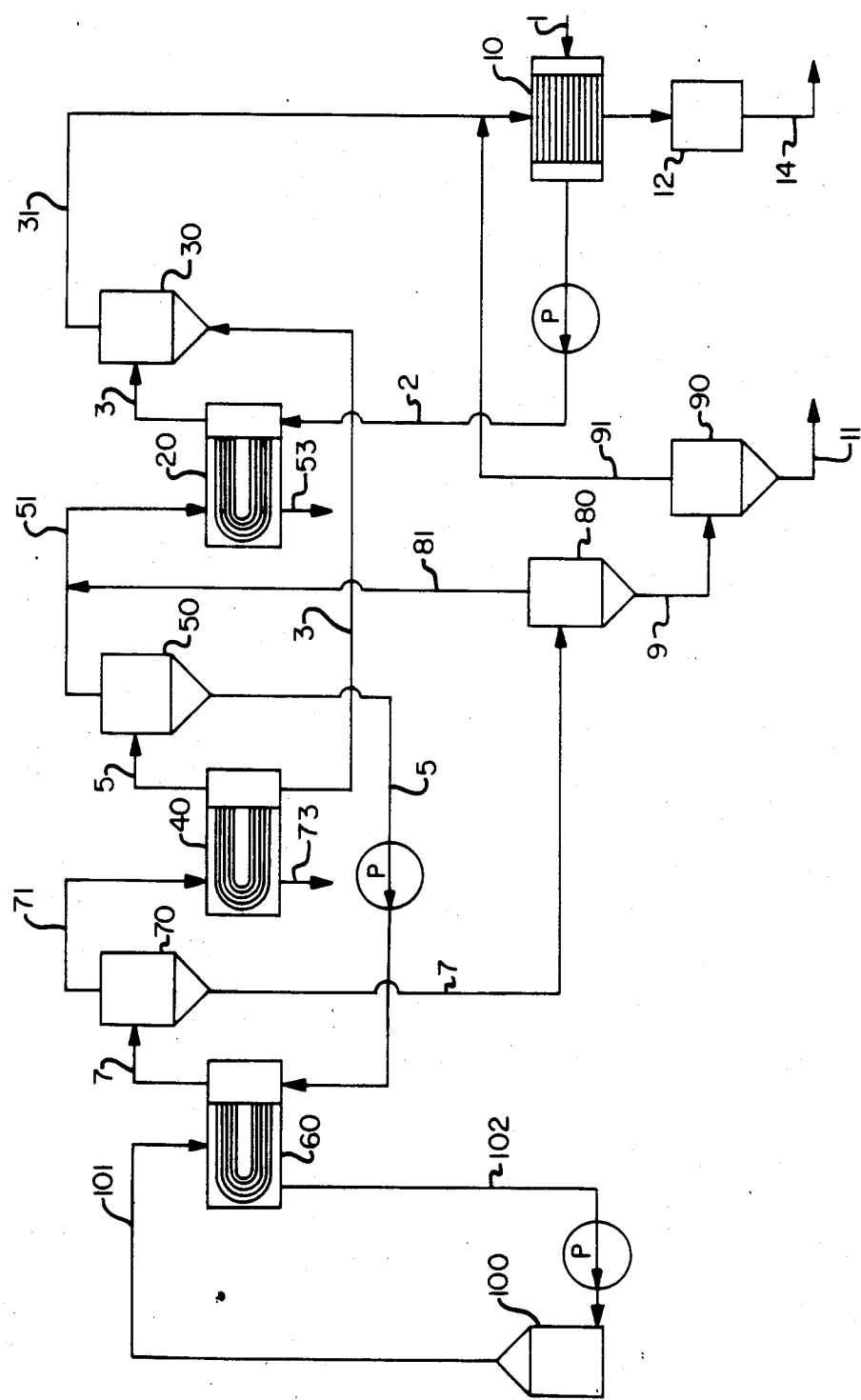
FIG. 3 is a schematic view of an embodiment of the process of the present invention using a plurality of noncontact evaporative heat exchangers.

As depicted in the FIG. 3 embodiment, a partially dried beneficiated clay slurry is passed through a plurality of evaporative heat exchangers to remove further water and concentrate the solids in the clay slurry to a level of at least 65% by weight and preferably 70% by weight. The beneficiated clay slurry 1 to be concentrated has been partially dewatered to a solids content in the range of about 50% to about 60% solids by weight in a typical conventional filter or vacuum press. In the embodiment of the process of the present invention as illustrated in FIG. 3, the beneficiated aqueous clay slurry 1 is preheated in preheater 10 and then pumped through a first evaporative heat exchanger 20 wherein a first portion of the water contained in the aqueous clay slurry is evaporated by passing the aqeous clay slurry in indirect heat exchange relationship with a heating vapor. The clay slurry 3 leaving the first evaporative heat exchanger 20 is then passed to a separating vessel 30 wherein the vapor evaporated from the clay slurry in the evaporative heat exchanger 20 is separated from the aqueous clay slurry. The aqueous clay slurry is then pumped from the separating vessel 30 through a second evaporative heat exchanger 40 disposed downstream of the first evaporative heat exchanger 20 wherein an additional portion of water is evaporated from the aqueous clay slurry 3 by again passing the aqueous clay slurry in indirect heat exchange relationship with a heating vapor. The aqueous clay slurry 5 leaving the second evaporative heat exchanger 40 is passed to a separating vessel 50 associated therewith wherein the vapor evaporated from the aqueous clay slurry in the evaporative heat exchanger 40 is separated from the slurry. The aqueous clay slurry 5 is then pumped from the separating vessel 50 through a third vapor evaporative heat exchanger 60 wherein the aqueous clay slurry is again passed in indirect heat exchange relationship with the heating vapor. The aqueous clay slurry 7 leaving the third evaporative heat exchanger 60 is then passed to a separating vessel 70 associated therewith wherein the vapor evaporated in the evaporative heat exchanger 60 is separated from the slurry. The clay slurry 7 is then pumped from the separating vessel 70 through flash tanks 80, 90 wherein additional water is removed from the aqueous clay slurry 7 by flash drying to concentrate the solids in the aqueous clay slurry to the desired level for shipment at a solids content of at least 65% by weight, and preferably 70% by weight.

In the first or upstream-most evaporative heat exchanger 20, the preheated aqueous clay slurry 2 is passed in indirect heat exchange relationship with the heating vapor 51 to evaporate a first portion of the water contained therein. The heating vapor 51 entering the upstream-most evaporative heat exchanger 20 comprises the water vapor evaporated from the aqueous clay slurry in the adjacent downstream evaporative heat exchanger 40 and separated from the aqueous clay slurry 5 in the separating vessel 50 associated with the evaporative heat exchanger 40. After passing in indirect heat exchanger relationship with the heating vapor 51, the aqueous clay slurry 3 passes from the upsteam-most evaporative heat exchanger 20 to the separating vessel 30 wherein the water vapor evaporated from the aqueous clay slurry in the evaporative heat exchanger 20 is collected. The heating vapor 51 is condensed in passing through heat exchanger 20 and the condensate 53 collected for use elsewhere in the plant in processing the clay.

Preferably, the water vapor 31 evaporated from the aqueous clay slurry 3 in the upsteam-most evaporative heat exchanger 20 is passed to the preheater 10 wherein it is passed in indirect heat exchange relationship with the incoming aqueous clay slurry to preheat the aqueous clay slurry therein. This vapor is then recovered in a flash condenser 12 and the condensate 14 collected for use elsewhere in the plant in processing the crude kaolin clay.

In the second or intermediate evaporative heat exchanger 40, the aqueous clay slurry from the first evaporative heat exchanger 20 is passed in indirect heat exchange relationship with a heating vapor 71 to evaporate further water from the aqueous clay slurry. The heating vapor 71 comprises the water vapor evaporated from the aqueous clay slurry in the adjacent downstream evaporative heat exchanger 60 and collectd in the separating vessel 70 associated therewith. After traversing the evaporative heat exchanger 40, the aqueous clay slurry 5 is passed through the separating vessel 50 wherein the water vapor 51 evaporated from the aqueous clay slurry in the evaporative heat exchanger 40 is separated from the aqueous clay slurry 5. The heating vapor 71 is condensed in passing through heat exchanger 40 and the condensate 73 collected for use elsewhere in the plant in processing the clay.

In the third or downstream-most evaporative heat exchanger 60, the aqueous clay slurry 5 from the evaporative heat exchanger 40 is passed in indirect heat exchange relationship with a heating vapor 101 to evaporate a third portion of water from the aqueous clay slurry. After having traversed the evaporative heat exchanger 60, the aqueous clay slurry 7 is passed to the separating vessel 70 associated therewith wherein the water vapor 71 evaporated from the aqueous clay slurry in the evporative heat exchanger 60 is separated from the aqueous clay slurry 7. As the evaporative heat exchanger 60 constitutes the downstream-most, i.e. the last, evaporative heat exchanger in the system, the heating vapor 101 supplied to the downstream-most evaporative heat exchanger 60 is supplied from an independent source. Typically, the heating vapor 101 would comprise low pressure, low temperature steam supplied from a gas-fired boiler 100. The steam 101 passing through the evaporation heat exchanger 60 would be condensed and the condensate 102 pumped back to the boiler 100.

Each of the separating vessels 30, 50 and 70 associated respectively with the indirect evaporative heat exchangers 20, 40 and 60, is operated at a different pressure. The pressure in each separating vessel is maintained such that it is lower than the pressure of the next adjacent downstream separating vessel and higher than the pressure maintained in the next upstream separating vessel. Therefore, the pressure maintained in the separating vessel 70 associated with the downstream-most evaporative heat exchanger 60 would be greater than the pressure maintained in the separating vessel 50 associated with the intermediate evaporative heat exchanger 40 which would be higher than the pressure maintained in the separating vessel 30 associated with the upstream-most evaporative heat exchanger 20. Additionally, the temperature to which the aqueous clay slurry is heated increases as the aqueous clay slurry passes through the plurality of the evaporative heat exchangers. Thus, the temperature of the aqueous clay slurry leaving the downstream-most evaporative heat exchanger 60 is higher than the temperature of the aqueous clay slurry leaving the intermediate evaporative heat exchanger 40 which is higher than the temperature of the aqueous clay slurry leaving the upstream-most evaporative heat exchanger 20. Accordingly, the water vapor 71 evaporated from the aqueous clay slurry in the downstream-most evaporative heat exchanger 60 would be higher in temperature than the water vapor 51 evaporated in the intermediate evaporative heat exchanger 50 which would be higher in temperature than the water vapor 31 evaporated in the upstream-most evaporative heat exchanger 40.

In order to further concentrate the aqueous clay slurry 7 leaving the separting vessel 70 associated with the downstream-most evaporative heat exchanger 60, and also to reduce the slurry temperature, the aqueous clay slurry 70 is passed to at least one flash tank wherein an additional portion of water vapor is evaporated from the aqueous clay slurry by flash drying and the temperature of the aqueous clay slurry is reduced. As shown in FIG. 3, the aqueous clay slurry 7 is passed from the separating vessel 70 associated with the downstream-most evaporative heat exchanger 60 to a first flash tank 80 which is maintained at a pressure substantially equal to the pressure maintained in the separating vessel 50. The additional water vapor 81 evaporated from the aqueous clay slurry in the first flash tank 80 has a temperature about equal to that of the water vapor 51 and is collected and mixed with the water vapor 51 evaporated from the separating vessel 50 to serve as the heating vapor in the next upstream evaporative heat exchanger 20. The aqueous clay slurry 9 leaving the flash tank 80 will typically be passed through an additional flash tank 90 wherein the aqueous clay slurry is further cooled and further concentrated by evaporating additional water therefrom through flash drying to provide a product clay slurry 11 ready for shipment. The presure in the second flash tank 90 would be maintained at a pressure equal to the pressure maintained in the separating vessel 30 associated with the upstream-most evaporative heat exchanger 20. The pressure maintained in the second flash tank 90 would thus be less than the pressure maintained in the first flash tank 80. The additional water vapor 91 evaporated from the aqueous clay slurry in the flash tank 90 would have a temperature about equal to that of the water vapor 31 and is therefore collected and mixed with the water vapor 31 evaporated from the aqueous clay slurry in the upstream-most evaporative heat exchanger 20 and used as the heating vapor to preheat the aqueous clay slurry in preheater 10.

As an illustrative example of carrying out the embodiment of the process of the present invention as illustrated in FIG. 3, various operational data for the clay slurry and heating vapor at pertinent locations in the process are presented respectively in Tables I and II below for the case of concentrating 378,000 pounds of beneficiated kaolin clay slurry at a solids content of 60% by weight to a product slurry having a solids content of 70% by weight.

TABLE I

| Slurry Identification | Flow Rate, lbs/HR | % Solids, by wt. | Temperature, °F. |
|---|---|---|---|
| 1 | 378,000 | 60.0% | |
| 2 | 378,000 | 60.0% | 110 |
| 3 | 364,630 | 62.2% | 120 |
| 5 | 357,730 | 63.4% | 180 |
| 7 | 342,080 | 66.3% | 240 |
| 9 | 333,530 | 68.0% | 180 |
| 11 | 324,000 | 70.0% | 120 |

TABLE II

| Heating Vapor Identification | Flow Rate, lbs/HR | Temperature, °F. | Pressure, Absolute, lbs/sq/in. |
|---|---|---|---|
| 31 | 13,370 | 120 | 1.692 |
| 51 | 6,900 | 180 | 7.510 |
| 71 | 15,650 | 240 | 24.969 |
| 101 | 27,000 | 300 | 67.013 |
| 81 | 8,550 | 180 | 7.510 |
| 91 | 9,530 | 120 | 1.692 |

Each of the evaporative heat exchangers utilized in carrying out the process of the present invention are indirect heat exchangers so that contact between the slurry and the heating vapor does not occur. Although shown in the drawing as shell and tube type heat exchangers, plate and frame type heat exchangers may also be used. In the embodiments of the process shown in the drawings, the aqueous clay slurry is passed through the tubes of the shell and tube heat exchangers while the heating vapor is passed through the shell over the outside of the tubes. By providing for indirect heat exchange, the rapid drying and subsequent agglomerate formation common to direct contact evaporative systems, such as spray dryers or directfired evaporators, is avoided. Therefore, the aqueous clay slurry processed in accordance with the present invention may be shipped directly from the final flash tank 90 without necessity for additional pulverizing in order to eliminate agglomerates which was commonly necessary in prior art systems utilizing direct contact evaporators.

It is to be understood that the process of the present invention may be carried out with any number of evaporative heat exchangers. Although shown as utilizing a single evaporative heat exchanger in the FIG. 1 and FIG. 2 embodiments and three evaporative heat exchangers in the Figure 3 embodiment, the exact number of heat exchangers for any given application will vary depending upon the amount of material to be processed and the economics of steam availability and capital expenditure. The use of a single indirect evaporative heat exchanger eliminates the need for steam except for initial start-up of the process. The use of a plurality of staged indirect evaporative heat exchangers greatly reduces the steam requirements necessary for evaporating the water from the aqueous clay slurry. The use of two stages of evaporative heat exchangers with the water vapor evaporated from the one stage serving as the heating medium for the other stage would reduce steam requirements to about one-half of the steam requirement for a single evaporative heat exchanger used to remove the same total amounts of water from the aqueous clay slurry. Similarly, the use of three stages would reduce steam requirements to onethird of that required in a single evaporator and the use of four stages would reduce the steam requirement to about onefourth that required in a single evaporator. However, as the number of stages utilized increases, the vapor pressure and temperature available for each additional stage is lower than the previous stage, therefore there is a diminishing return associated with the adding of additional stages. The optimum number of stages for any given application will vary with economics.

I claim:

1. A method for concentrating solids in an aqueous clay slurry by evaporating water therefrom comprising
    a. passing the aqueous clay slurry through a plurality of evaporative heat exchangers in series flow in indirect heat exchange relationship with a heating vapor, at least a portion of the heating vapor in each of said evaporative heat exchangers comprising the water vapor evaporated from the aqueous clay slurry in passing through another of said adjacent evaporative heat exchangers, except in the downstream-most of the evaporative heat exchangers wherein the heating vapor is supplied from an independent source; and
    b. passing the aqueous clay slurry exiting the downstream-most evaporative heat exchanger through at least one flash tank wherein additional water vapor is evaporated from the aqueous clay slurry thereby further concentrating the solids in the aqueous clay slurry.

2. A method for concentrating solids in an aqueous clay slurry as recited in claim 1 further comprising passing the water vapor evaporated from the aqueous clay slurry in said at least one flash tank in indirect heat exchange relationship with the aqueous clay slurry in at least one of said evaporative heat exchangers to form a portion of the heating vapor passing therethrough.

3. A method for concentrating solids in an aqueous clay slurry as recited in claim 2 further comprising preheating the aqueous clay slurry in passing the aqueous clay slurry in indirect heat exchange relationship with the water vapor evaporated from the aqueous clay slurry in the upstream-most evaporative heat exchanger prior to passing the aqueous clay slurry to the upstream-most evaporative heat exchanger.

4. A method of producing kaolin clay product slurry having a solids content of at least 65% by weight by concentrating solids in a lower solids content beneficiated aqueous kaolin clay slurry comprising passing the lower solids content beneficiated aqueous kaolin clay slurry in indirect heat exchange relationship with a heating vapor so as to evaporate water therefrom without contacting the beneficiated kaolin clay with the heating vapor.

5. A method as recited in claim 4 further comprising collecting the water vapor evaporated from the aqueous clay slurry, compressing the collected water vaor so as to cause an increase in the temperature of the collected water vapor, and passing the compressed vapor through said evaporative heat exchanger as said heating vapor in indirect heat exchange relationship with the aqueous clay slurry.

6. A method as recited in claim 5 wherein the step of compressing the collected water vapor comprises thermally compressing the collected water vapor by mixing steam therewith to generate a mixture having a temperature greater than that of the collected water vapor.

7. A method as recited in claim 4 wherein the heating vapor comprises steam.

8. A method as recited in claim 4 wherein the heating vapor comprises water vapor previously evaporated from the aqueous clay slurry.

9. A method as recited in claim 4 wherein the heating vapor comprises a mixture of steam and water vapor previously evaporated from the aqueous clay slurry.

10. A method of producing a kaolin clay product slurry having a solids content of at least 65% by weight by concentrating solids in a lower solids content beneficiated aqueous kaolin clay slurry comprising passing the lower solids content beneficiated aqueous clay slurry through a plurality of evaporative heat exchangers in series flow in indirect heat exchange relationship with a heating vapor so as to evaporate water therefrom without contacting the beneficiated kaolin clay with the heating vapor, at least a portion of the heating vapor in each of said evaporative heat exchangers comprising the water vapor evaporated from the aqueous clay slurry in passing through another of said adjacent evaporative heat exchangers, except in the downstream-most of the evaporative heat exchangers wherein the heating vapor is supplied from an independent source.

11. A method of producing a kaolin clay product slurry having a solids content of at least 65% by weight by evaporating water from a lower solids content beneficiated aqueous kaolin clay slurry thereby concentrating the solids therein comprising:
    a. passing the lower solids content beneficiated aqueous kaolin clay slurry through an evaporative heat exchanger in indirect heat exchange relationship with a heating vapor so as to evaporate water therefrom without contacting the beneficiated kaolin clay slurry with the heating vapor; and
    b. passing the beneficiated aqueous kaolin clay slurry exiting the evaporative heat exchanger through at least one flash tank wherein additional water vapor is evaporated from the beneficiated aqueous kaolin clay slurry thereby further concentrating solids therein.

* * * * *

UNITED STATES PATENT AND TRADEMARK OFFICE
CERTIFICATE OF CORRECTION

PATENT NO. : 4,687,546
DATED : August 18, 1987
INVENTOR(S) : Mark S. Willis

It is certified that error appears in the above—identified patent and that said Letters Patent is hereby corrected as shown below:

Col. 9, line 52, (Claim 3, line 3), "in" should read --by--.

Col. 10, line 8, (Claim 5, line 3), "vaor" should read --vapor--.

Signed and Sealed this

Twenty-sixth Day of December, 1989

Attest:

JEFFREY M. SAMUELS

Attesting Officer     Acting Commissioner of Patents and Trademarks

REEXAMINATION CERTIFICATE (2899th)

United States Patent [19]
Willis

[11] B1 4,687,546
[45] Certificate Issued Jun. 4, 1996

[54] METHOD OF CONCENTRATING SLURRIED KAOLIN

[75] Inventor: Mark S. Willis, Milledgeville, Ga.

[73] Assignee: Anglo-American Clays Corp, Wilmington, Del.

Reexamination Request:
No. 90/003,256, Nov. 11, 1993

Reexamination Certificate for:
Patent No.: 4,687,546
Issued: Aug. 18, 1987
Appl. No.: 757,049
Filed: Jul. 19, 1985

Certificate of Correction issued Dec. 26, 1989.

[51] Int. Cl.⁶ ............................... B01D 1/28; B01D 3/06
[52] U.S. Cl. ................... 159/47.1; 159/2.1; 159/17.1; 159/24.3; 159/DIG. 32; 202/174; 202/176; 202/235; 203/14; 203/26; 203/27; 203/88; 203/DIG. 8; 210/774; 501/150
[58] Field of Search ..................... 159/2.1, 17.1, 159/24.3, 46, 47.1, 24.1, DIG. 8, DIG. 16, DIG. 32; 202/174, 176, 235; 203/88, 71, 26, DIG. 8, 14, 27; 210/774; 501/150; 162/181.8, 189

[56] References Cited

U.S. PATENT DOCUMENTS

| | | |
|---|---|---|
| 2,032,182 | 2/1936 | Oman. |
| 2,181,146 | 11/1939 | Peebles et al.. |
| 2,406,581 | 8/1946 | Bergstrom et al.. |
| 2,487,884 | 11/1949 | Lunt. |
| 2,560,807 | 7/1951 | Lobo. |
| 2,647,570 | 8/1953 | Lockman. |
| 2,735,787 | 2/1956 | Eastman et al.. |
| 2,763,434 | 9/1956 | Strasser. |
| 2,777,514 | 1/1957 | Eckstrom. |
| 2,895,546 | 7/1959 | Sadtler. |
| 2,920,832 | 1/1960 | Duke. |
| 3,021,265 | 2/1962 | Sadtler et al.. |
| 3,165,435 | 1/1965 | Henszey. |
| 3,176,755 | 4/1965 | Harman. |
| 3,289,736 | 12/1966 | Rosenblad. |
| 3,323,575 | 6/1967 | Greenfield. |
| 3,362,457 | 1/1968 | Chirico. |
| 3,396,086 | 8/1968 | Starmer. |
| 3,428,107 | 2/1969 | Backteman. |
| 3,469,616 | 9/1989 | Laguilharre. |

(List continued on next page.)

FOREIGN PATENT DOCUMENTS

| | | |
|---|---|---|
| 0032171 | 3/1979 | Japan. |
| 1065619 | 4/1967 | United Kingdom. |
| 2046108 | 11/1980 | United Kingdom. |

OTHER PUBLICATIONS

Roget's International Thesaurus, 3rd ed. Thomas Y Crowell Co., New York, 1834 pp. 398.2–401.7.

Perry et al "Distillation", 2nd ed. Interscience Publishers, 1965, p. 2.

Hackh's Chemical Dictionary, 4th ed. McGraw Hill pp. 163–164.

John H. Perry, "The Drying of Solids," *Chemical Engineers' Handbook* 1502–1504 (2nd ed. 1941).

C. E. Bill, "Rotary Steam–Tube Dryer," Industrial and Engineering Chemistry 997–999 (1938).

A. Weisselberg, "Vertical Turbodryers," Industrial and Engineering Chemistry 999–1000 (1938).

A. Williams–Gardner, "Film Drum Dryers," *Industrial Drying* 220–241 (1971).

Robert H. Perry, Perry's Chemical Engineers' Handbook 22–120–22–121 (6th ed. 1984).

*Primary Examiner*—Virginia Manoharan

[57] ABSTRACT

A beneficiated kaolin clay slurry is concentrated from a solids content of about 50% to 60% by weight to a solids content of at least 65% by weight by evaporating water therefrom by passing the aqueous clay slurry through one or more non-contact evaporated heat exchangers. The kaolin clay slurry is passed in indirect heat exchange relationship with a heating vapor, with the heating vapor comprising water vapor previously evaporated from the aqueous clay slurry.

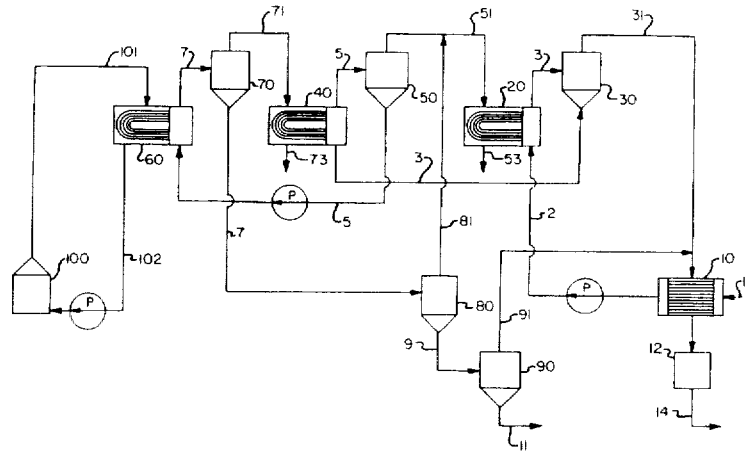

U.S. PATENT DOCUMENTS

| | | | |
|---|---|---|---|
| 3,475,281 | 10/1969 | Rosenblad . | |
| 3,514,375 | 5/1970 | Dambrine . | |
| 3,587,488 | 6/1971 | Mutke et al. . | |
| 3,889,390 | 6/1975 | Klare . | |
| 4,002,525 | 1/1977 | Baierl . | |
| 4,044,820 | 8/1977 | Nobles . | |
| 4,097,378 | 6/1978 | St. Clair | 159/DIG. 33 |
| 4,132,588 | 1/1979 | Ogawa . | |
| 4,185,395 | 1/1980 | Nakako et al. . | |
| 4,246,039 | 1/1981 | Mixon, Jr. . | |
| 4,247,991 | 2/1981 | Mehta . | |
| 4,276,115 | 6/1981 | Greenfield et al. . | |
| 4,303,468 | 12/1981 | Laguilharre et al. . | |
| 4,381,220 | 4/1983 | Standiford . | |
| 4,473,438 | 9/1984 | Loureiro . | |
| 4,642,904 | 2/1987 | Smith, Jr. | 34/75 |
| 4,962,279 | 10/1990 | Anderson et al. . | |
| 5,036,599 | 8/1991 | Thompson | 34/290 |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 and 10 are confirmed.

Claims 4–9 and 11 are cancelled.

New claim 12 is added and determined to be patentable.

*12. A method of producing kaolin clay product slurry having a solids content of at least 65% by weight comprising:*

*a. providing a lower solids content beneficiated aqueous kaolin clay slurry having a solids content of at least 15% by weight;*

*b. filtering the lower solids content beneficiated aqueous kaolin clay slurry and thereby increasing to 50–60% by weight the solids content of the lower solids content beneficiated aqueous clay slurry; and*

*c. thereafter increasing the solids content of the lower solids content beneficiated aqueous kaolin clay slurry to at least 65% and not more than about 70% by weight by:*

*i. passing the lower solids content beneficiated aqueous kaolin clay slurry in indirect heat exchange relationship with a heating vapor so as to evaporate water therefrom without contacting the beneficiated kaolin clay with the heating vapor; and*

*ii. thereafter passing the beneficiated aqueous kaolin clay slurry to a separating vessel maintained at less than atmospheric pressure, and therein:*

*A. boiling the slurry; and*

*B. separating the slurry from the water vapor produced by boiling the slurry.*

\* \* \* \* \*